(12) United States Patent
Fisher et al.

(10) Patent No.: US 8,857,197 B1
(45) Date of Patent: Oct. 14, 2014

(54) DEVICE AND METHOD FOR MIXING VISCOUS SUBSTANCES

(75) Inventors: Robyn Sue Fisher, San Francisco, CA (US); David M. Fischer, Waltham, MA (US)

(73) Assignee: Smitten Ventures, Inc., San Francisco, CA (US)

( * ) Notice: Subject to any disclaimer, the term of this patent is extended or adjusted under 35 U.S.C. 154(b) by 333 days.

(21) Appl. No.: 13/243,978

(22) Filed: Sep. 23, 2011

Related U.S. Application Data

(60) Provisional application No. 61/403,966, filed on Sep. 23, 2010, provisional application No. 61/404,127, filed on Sep. 27, 2010.

(51) Int. Cl.
*F25C 1/00* (2006.01)
(52) U.S. Cl.
USPC ............................................................. 62/66

(58) Field of Classification Search
USPC .......... 62/66, 343, 345; 165/61; 366/200, 206
See application file for complete search history.

(56) References Cited

U.S. PATENT DOCUMENTS

| | | | | |
|---|---|---|---|---|
| 1,762,081 A * | 6/1930 | Schleicher | ................... | 366/288 |
| 3,061,281 A * | 10/1962 | Phelan et al. | ................ | 366/196 |
| 4,089,367 A * | 5/1978 | Wietzel et al. | ................... | 165/61 |
| 6,510,890 B1 * | 1/2003 | Paskach et al. | ................. | 165/61 |
| 6,758,047 B1 * | 7/2004 | Giles | ................................ | 62/66 |
| 6,796,706 B2 * | 9/2004 | Wilson | ........................ | 366/200 |

\* cited by examiner

*Primary Examiner* — Melvin Jones
(74) *Attorney, Agent, or Firm* — Peters Verny, LLP

(57) ABSTRACT

Systems and methods of producing a frozen food product include dosing ingredients with a liquefied gas while mixing the ingredients using self-cleaning interlocking beaters. The beaters are optionally also disposed to clean a container in which the ingredients are frozen. The rate and amount of cooling is controlled by measuring the quantity of liquid nitrogen, measuring viscosity of the frozen food product, measuring temperature, and/or the like.

29 Claims, 11 Drawing Sheets

DEVICE AND METHOD FOR MIXING VISCOUS SUBSTANCES

CROSS-REFERENCE TO RELATED APPLICATIONS

This application claims priority and benefit of U.S. provisional patent application Ser. No. 61/403,966 filed Sep. 23, 2010 and entitled "Device and Method for Mixing Viscous Substances," and U.S. provisional patent application Ser. No. 61/404,127 filed Sep. 27, 2010 and entitled "Device and Methods for Dosing Cryogenic Liquid." The disclosures of the above patent applications are hereby incorporated herein by reference.

BACKGROUND

1. Field of the Invention

The invention is in the field of generating frozen mixtures, and in some embodiments in the field of ice cream manufacture.

2. Related Art

Ice cream, one of many frozen confections, is a well known and favorite desert of millions of people. It is commonly prepared by mixing ingredients such as milk, dairy products, sugar, emulsifying agents, stabilizers, colorants and flavoring agents, sometimes in admixture with solid ingredients that are to be dispersed through the final product, agitating the ingredients while they are chilled and then freezing the mixture.

SUMMARY

Various embodiments of the invention include systems and methods of creating ice cream using a liquefied gas to rapidly cool the ingredients. Rapid cooling produces desirable characteristics in ice cream.

An exemplary embodiment includes a system for reproducibly providing doses of liquid nitrogen to ice cream ingredients. The amount of liquid nitrogen provided can be controlled by pre-measuring a quantity of liquid nitrogen, by measuring viscosity of the cooling ingredients, measuring the amount of cooling achieved, or any combination of these approaches.

Various embodiments of the invention include a system comprising a container mount configured to support a container, a first motor configured to rotate the container mount, a container configured to hold ingredients and to temporally attached to the container mount, a liquid nitrogen dosing system configured to provide a controlled amount of liquid nitrogen to the ingredients in the container such that the ingredients freeze, and interlocking beaters configured to mix the ingredients in the container and configured to be self clearing to each other, the interlocking beaters being disposed to pass within $1116^{th}$ of an inch of each other without contacting each other, the self-cleaning being sufficient to remove the frozen ingredients from the interlocking beaters.

Various embodiments of the invention include a method of making ice cream, the method comprising: placing ingredients in a container; mixing the ingredients using at least two interlocking beaters disposed such that the interlocking beaters are within $1/8^{th}$ of an inch of each other but do not touch each other; rotating the container in a direction opposite a rotation of a member of the beaters closest to a side of the container; freezing the ingredients during the steps of mixing and rotating by adding a controlled amount of a coolant to the ingredients, the coolant optionally includes a liquefied gas.

Various embodiments of the invention include a system comprising: a container configured to hold ingredients and to rotate; at least two interlocking beaters configured to mix the ingredients in the container and configured to be self clearing from each other and to clean a side and/or bottom surface of the container; a liquid nitrogen dosing system configured to provide a controlled amount of cooling from a liquid nitrogen source to the ingredients; a temperature sensor configured to measure the controlled amount of cooling; and a controller configured to regulate the delivery of liquid nitrogen from the liquid nitrogen source in response to the measurement of the controlled amount of cooling.

DETAILED DESCRIPTION

Figure 1:
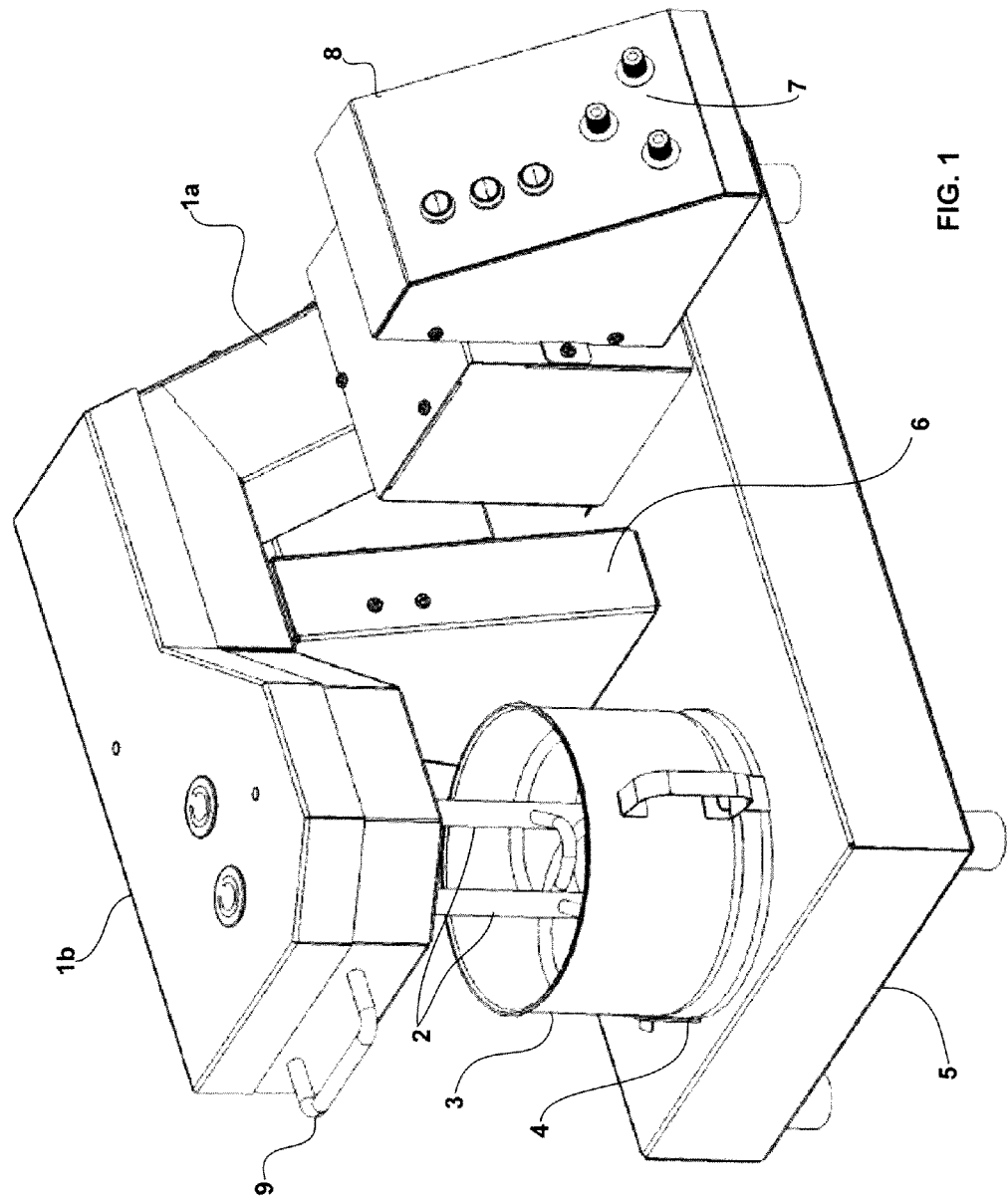
FIG. 1 illustrates a general perspective view of an ice cream production device, according to various embodiments of the invention.

FIG. 1 illustrates a mixer-like body with arm 1a that attaches to mixer head 1b. Extending down from the mixer head are two or more beaters (e.g., agitators or mixing arms) 2. Beneath the beaters is a container 3. The container clips or locks into place atop a container mount 4. The container mount is optionally heated and sits atop body 5. The mixer head may or may not have supporting structure 6. The device may be controlled by on/off switch or lever, or by a more detailed control panel 7. The wiring and components for the device may or may not have protected casings 8. The mixer arm 1a is designed such that the container can be removed and inserted under the beaters. In this embodiment, the mixer arm can move from the production position (shown) to an upright position, wherein the head 20 tilts up and back. Additionally, the mixer head may or may not have handle 9, which can be used to move the mixer head to and from the production position. In alternative embodiments the mixer up may move up or to the side to clear the container 3.

Figure 2:
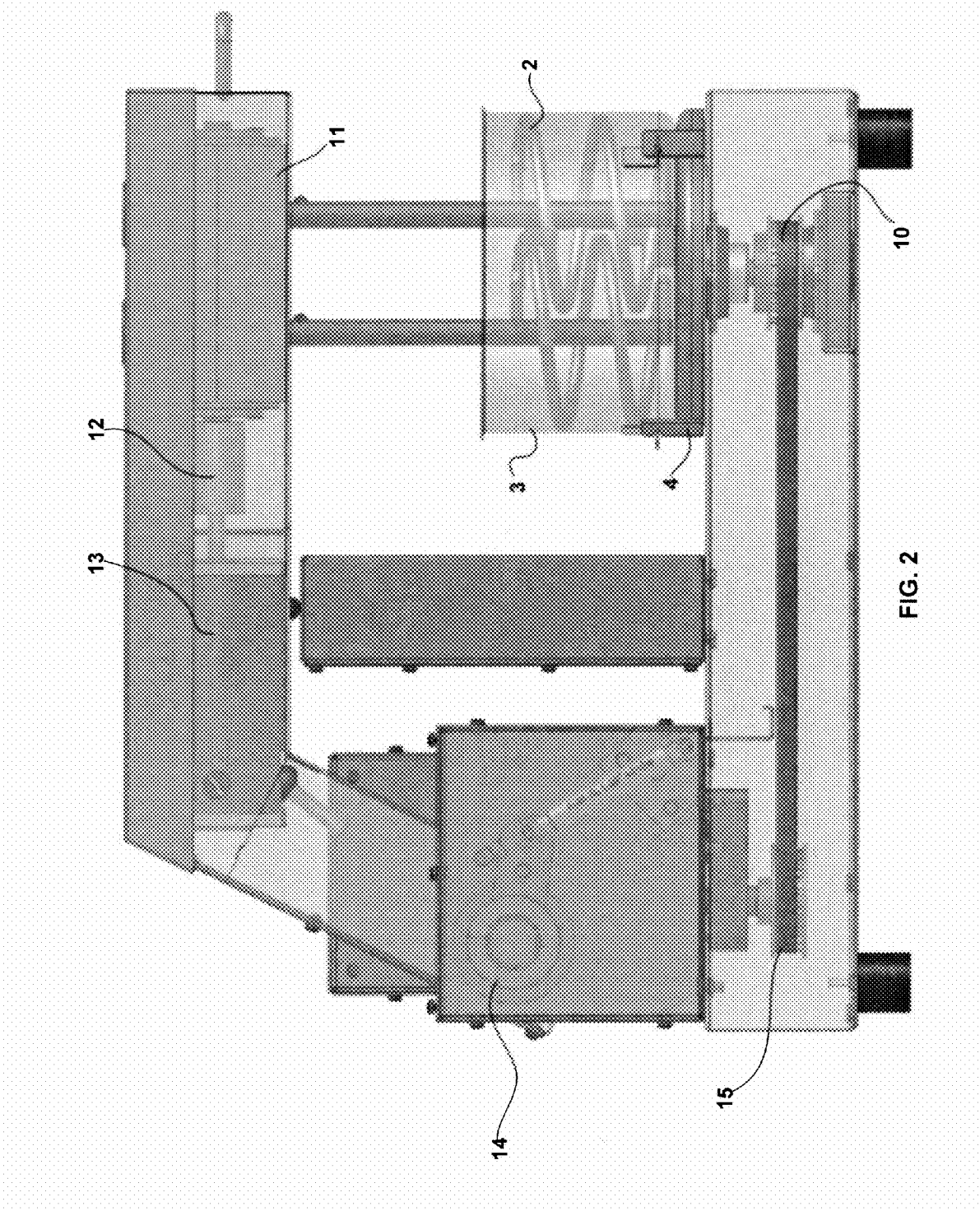
FIG. 2 illustrates the interior components of the system illustrated in FIG. 1, according to various embodiment of the invention.

FIG. 2 shows container mount 4 connected to a belt drive 10 and powered with a mount motor (or combination of transmission and motor) 15. Container 3 is optionally connected to container mount 4 by a spindle (not shown0. The spindle can be concentric or non-concentric with container 3. Beaters 2 are driven by transmission 11, which is connected to motor 13 (also visible is shaft coupler 12). In this embodiment, mixer arm 1a is raised using e.g. gas spring 14.

Figure 3A:
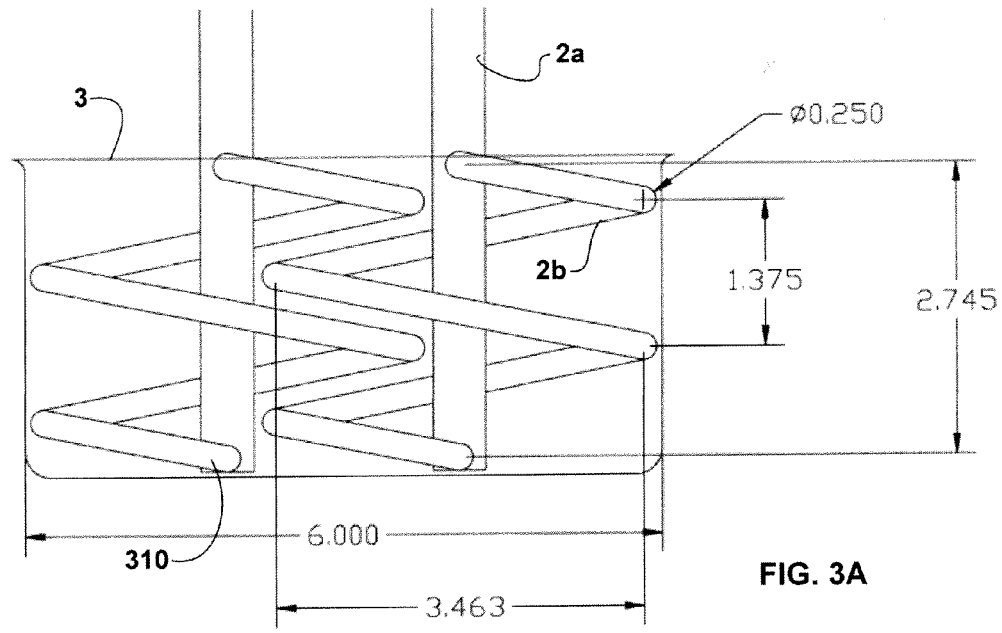
FIGS. 3A and 3B illustrate the interconnectivity of the beater and container design, according to various embodiments of the invention.
Figure 3B:
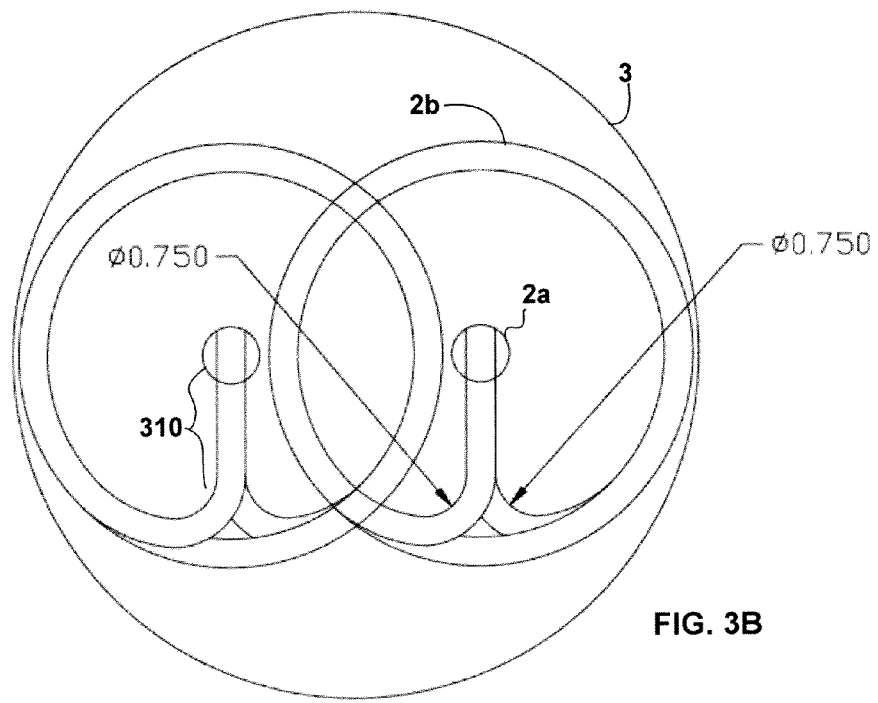

FIGS. 3A and 3B show one embodiment of the interconnectivity of the beaters and container design. Each beater 3 has a shaft 2a and a helical spiral 2b. The beaters 3 are matched such that, when they are paired together and inserted into the mixer head 1b, the spirals fit 2b inside each other without touching the other spiral 2b or the other beater 2a shaft but within very close proximity of both. Specifically, the diameter of the spiral 2b and center shaft 2a as well as the wire diameter (i.e., thickness of the spiral) is such that the outer edge of one beater's spiral almost comes into contact with the shaft of the other beater. In various embodiments this distance can be less than $1/4$, $3/16^{th}$, $1/8^{th}$, or $1/16^{th}$ inches. In addition, the pitch, diameter, spacing and wire diameter is such that, at the center intersection of the installed beaters 3, the high side of one spiral is directly under the low side of the other. Because the helical spirals 2b of the beaters 3 overlap and part of one of the helical spirals 2b is always close to part of the other of the helical spirals 2b as they turn, the beaters are considered to be "interlocked." As used herein, the term "interlocked beaters" is defined to include these features. Furthermore, the high side of one spiral 2b is almost in contact with the low side of the other at the front proximity point and the low side of that same spiral is almost in contact with the high side of the other at the rear proximity point (no actual contact but can be less than $1/16^{th}$, $1/8^{th}$ or $3/16^{th}$ inch apart in various embodiments). Representative measurements are shown in FIGS. 3A and 3B. These measurements are for illustrative purposes only and are not meant to be limiting. This design is scalable vertically and scalable in size. There are many possible cross-sectional designs for the spirals, including, elliptical, rectangular, circular, etc.

In this embodiment of the beater and container design, the beaters 2, when installed into the mixer head, are sized to closely fit the interior walls of the container 3, such that the outer edge of each spiral is in very close proximity with the interior wall of the container. For example, in various embodiments, separation between helical spirals 2b and the side of container 3 is less than $1/16^{th}$, $1/8^{th}$ or $3/16^{th}$ inch. While this close fitting container 3 was found to be the advantageous, a larger container 3 would also be possible, as long as the diameter of the collective beaters 2 is longer than the radius of the container (See, for example, FIG. 8A-C). Additionally, an off-center container mount 4 could be used. Regardless, the taper of the helical spirals 2b should match that of the container 3—for example, if the helices do not taper, as shown in this variation, then the container 3 is straight-sided and flat-bottomed, such that the bottom of the helical spirals 2b are able to be within very close proximity to the interior bottom of the container 3.

A region 310 of helical spirals 2b is optionally parallel to a bottom of container 3 and is optionally straight. Region 310 is at the part of helical spirals 2b closest to the bottom. In various embodiments all or most of Region 310 is less than $1/16^{th}$, $1/8^{th}$ or $3/16^{th}$ inch from the bottom of container 3. As such, in some embodiments, essentially all of the bottom is cleaned by the relative motion of container 3 and beaters 2.

Figure 4:
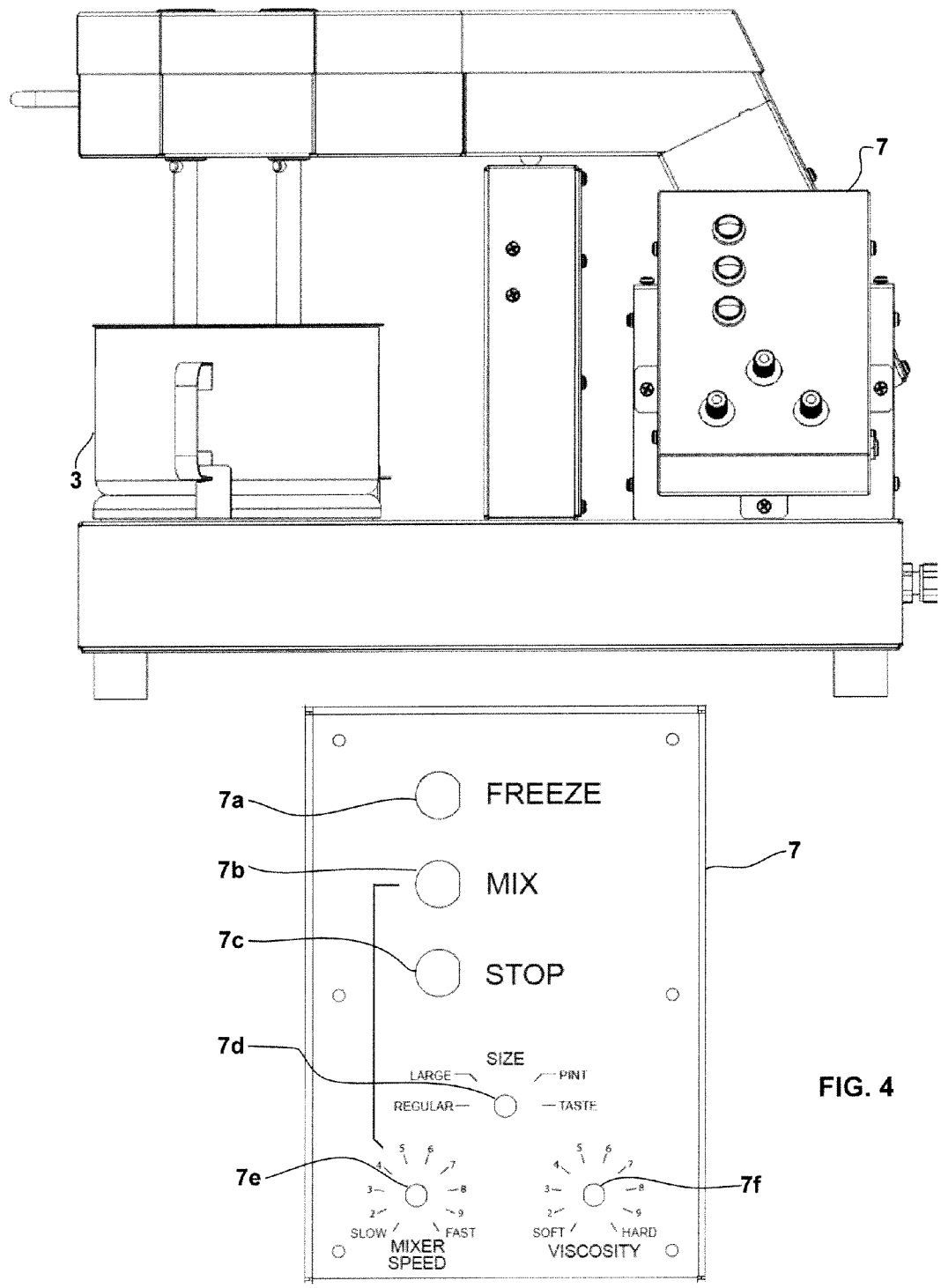
FIG. 4 illustrates a control panel, according to various embodiments of the invention.

FIG. 4 shows an exemplary embodiment of a detailed control panel 7 when this embodiment is used for preparing a frozen product using liquid nitrogen—one of many potential applications of this invention. In this example, there is a freeze button 7a (which could be removed if the embodiment was not used for frozen applications), a mix button 7b, and a stop button 7c. This example also includes a size knob 7d, which can be used to select various serving sizes (regular, large, pint, taste). This variation also includes a mixer Speed knob 7e, which ranges from slow to fast. This example also includes a viscosity knob 7f, which ranges from soft to hard. The viscosity knob 7f is configured to control the viscosity of the final product, which may be determined by measuring actual viscosity or some other parameter as discussed elsewhere herein. The interior of this variation of control panel could include a printed circuit board with wiring connections. Mixer Speed knob 7e can be configured to control the speed of beaters 2 and/or container mount 4.

Figure 5:
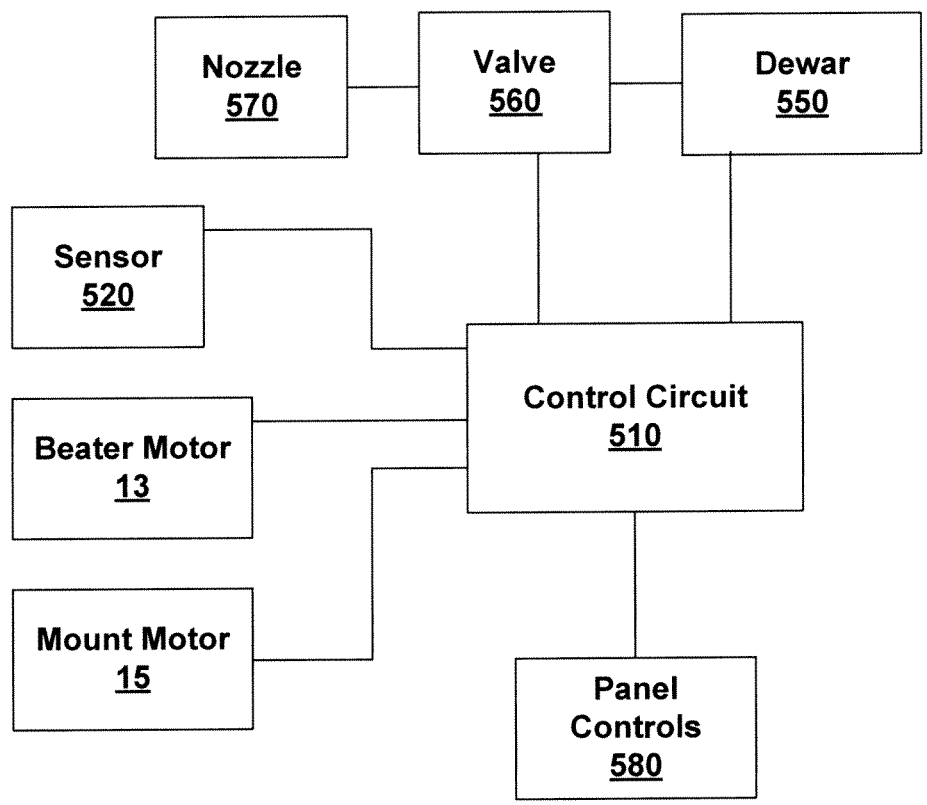
FIG. 5 illustrates a block diagram of the control panel illustrated in FIG. 4, according to various embodiments of the invention.

FIG. 5 shows an example of a block diagram of a control circuit 510 and other components of the system associated with the control panel 7 shown in FIG. 4. Wiring from control circuit 510 connects to various components of the device, including to the panel controls 580, mount motor 15 and beater motor 13. For example, Control Circuit 510 may be connected to one or more valves 560 configured to control the flow of liquid nitrogen from a Dewar 550 to a Nozzle 570. Nozzle is typically disposed adjacent to container 3 such that the liquid nitrogen that flows from the nozzle reaches the ice cream ingredients. Valve 560 is optionally replaced by a scoop or other device configured for sampling a controlled amount of liquid nitrogen. Control Circuit 510 is optionally connected to a level sensor within Dewar 550. Beater Motor 13 is configured to rotate beaters 2. Mount motor 15 is configured to rotate container mount 4.

Sensor 520 is configured to detect properties of the frozen ingredients during the freezing process. In some embodiments, sensor 520 is configured to detect a viscosity of the ingredients. For example, sensor 520 may be configured to detect a load on beater motor 13 or mount motor 15. In some embodiments, sensor 520 includes a temperature measurement device, such as a thermocouple. The thermocouple can be connected to beaters 2, container 3, and/or nozzle 570. In some embodiments the thermocouple is disposed in the stream of liquid nitrogen as it leaves nozzle 570. In addition to the thermocouple, sensor 520 can include a metallic or non-metallic probe (e.g., a copper plate) whose temperature is changed by the liquid nitrogen and is measured by the thermocouple. Some embodiments include more than one sensor 520.

One or more viscous substances is/are placed in container 3. For example, if the method is being used to make a frozen dessert, such ingredients may include unfrozen ice cream or custard mix, or pureed fruit for sorbet, or yogurt, or milk or cream, or a non-dairy substitute for milk or cream. Additional ingredients/accompaniments/toppings (e.g., in the case of a frozen dessert: cookies, fresh fruit, or nuts) may also be added to the container prior to or during the process of mixing (and, in this case, freezing). Substance/ingredients may either be placed into the container before or after the container is placed on the container mount.

When the Mix button on control panel 7b is pressed, beater transmission 11, driven by its accompanying motor 13, rotates the beaters, with each beater rotating in the same direction and speed of rotation as the other beater. In some embodiments, the spirals of the beaters move in a downward direction such that the spiral helices 2b are pushing the substance/ingredients downward into the container. At the same time, belt drive 10 powered by its accompanying gear-motor 15 rotates the container 3 at an asynchronous speed relative to the beaters. In some embodiments, the container 3 rotates (typically but not necessarily in the opposite direction as the collective beaters 2) and turns at such a speed with non-small integer ratios such that essentially all of the container's side is scraped by the beaters (again, the beaters 3 not quite touching the side of container 2). In other embodiments the container 3 does is fixed and does not rotate. In these embodiments motor 15 and the associated drive system elements are optional. To demonstrate the rotating container embodiment, in FIG. 3A, spiral helices 2b move counter-clockwise, while container 3 moves clockwise. Due to the beaters' helical shape and movement, in practice, the beaters 2 act to scrape the ingredients from each other's surface and to propel the ingredients down into the container. The ability to remove frozen ingredients from each other makes the beaters 2 jointly self-cleaning. Additionally, because the beaters 2 are designed to fit the container 3 and the container 3 is rotating at an asynchronous speed relative to the collection of beaters, the beaters also act to scrape the ingredients off of the sides of the container 3. Due to the asynchronous movement between the collective beaters and the container 3, the collective beaters 2 are, in essence, orbiting together around the interior surface of the container 3, such that most interior sides of the container are scraped by the collective beaters. If pitch, diameter, spacing and wiring gauge are all correct, most of the surfaces are close to a scraping action. The underlying purpose of this beater-container design is to ensure that the substance in the container is evenly mixed (and, in the case of making a frozen product, frozen) throughout and that all ingredients are incorporated into the mixing (and, in the case of making a frozen product, freezing) process. Additionally, the collective helical beater design minimizes crushing of additive by allowing their escape from between moving parts, using a wiping rather than a crushing motion at intersections. This beater-container design is especially effective for making frozen product using liquid nitrogen as the freezing agent because the formation of small ice crystals has a significant impact on the texture of the frozen product (e.g., ice cream). Some embodiments of the invention ensure the creation of an exceptionally high quality frozen novelty product—the formation of exceptionally small ice crystals—because of the even distribution of the ingredients, the constant scraping of ingredients off surfaces, and the downward motion of the spirals.

The control circuit 510 can be programmed to run the motors for a number of seconds every time the mix button is pressed and then to stop running the motors after that time is up. Alternatively, the control circuit 510 can be programmed to run the motors continuously, in which case Stop button 7c can be pressed to halt the motors. There may or may not be a mixer speed knob 7e, which moves the beaters 2 and/or the container 3 faster and slower depending on its position. Additionally, if desired, the mix button can be programmed to read Size knob 7d (such that the device mixes for a longer time depending on the amount of ingredients placed in the container) and/or Viscosity knob 7f (such that the device mixes until the desired viscosity has been reached).

Embodiments may or may not have viscosity measurement capabilities, i.e. the viscosity knob 7f on the control panel 7. When this capability is included, the entire device can be integrated and the entire mixing (and, in the case of making a frozen product, freezing) process can be completely automated, without requiring the watchful eye of a machine operator. For example, in some embodiments, control circuit 510 is programmed to read the torque of either the beater motor or the container motor and control the dosing of coolant depending on the measured torque and the viscosity knob 7f setting. Generally, the beater torque has a lot of noise in it, so in one approach is to use the measurement of the container motor torque and to use a small motor, which can give a good indicator of how viscous the substance is. Because the collective beaters have asynchronous movement relative to the container, the motors driving the container and beaters are, in essence, working against each other to some degree. For instance, in the aforementioned example, the container is moving in the opposite direction as the collective beaters such that the collective beaters are working "against" the container. As such, when the substance or ingredients is/are thickening, the motors have to work harder and harder. By setting the desired viscosity, the operator is indicating how hard the motor should work before stopping and, in essence, before the substance/product is done and ready for removal from the container (or ready for the next step in its mixing process). The control circuit 510 can be programmed to take into account momentary increases in torque as a result of the beaters working through chunks (e.g., in the case of making a frozen dessert, these chunks may be nuts or chocolate chips). For instance, logic on control circuit 510 can be set to shut down the system (and stop coolant introduction) when the system exceeds a certain torque for a number of seconds in a row. As such, momentary increases in torque are ignored. This logic can include hardware, firmware and/or software stored on a computer readable medium.

In the case of making a frozen product using liquid nitrogen, liquid nitrogen can either be added manually or through a dosing system, which would typically be connected to a liquid nitrogen supply—an example of this supply is shown as Dewar 550 in FIG. 5. If the liquid nitrogen is added manually, then the freeze button 7a on control panel 7 acts the same as mix button 7b. In this case, there need only be one button or lever, in essence Mix/Freeze, which activates the device. Note that the mix button 7b is optional. Mixing can occur manually outside of the container 3.

Figure 6:
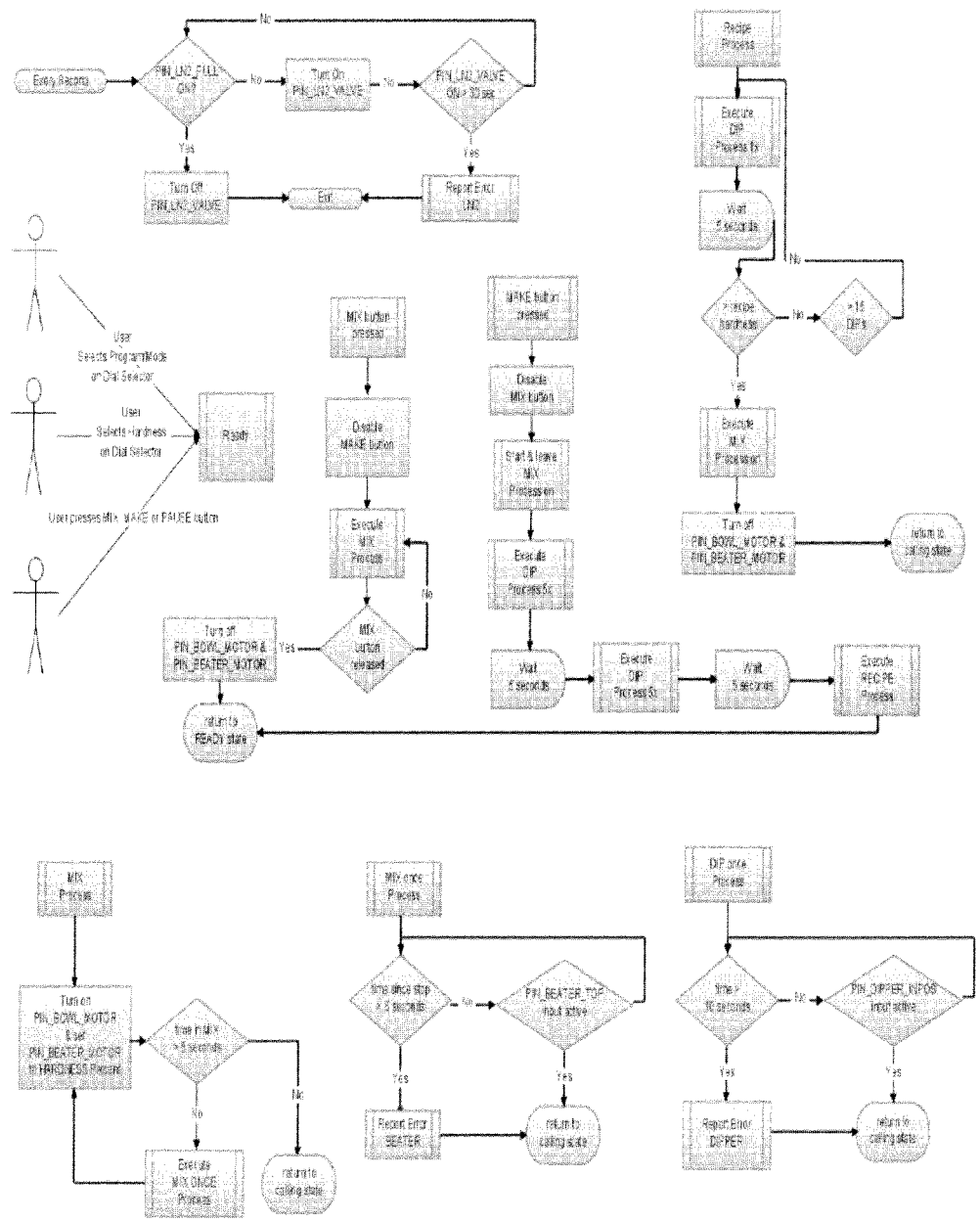
FIG. 6 illustrates a flow chart of an example algorithm for dispensing of liquid nitrogen, according to various embodiments of the invention.

If the device is hooked up directly to a liquid nitrogen supply and accompanying dosing system, then the freeze button 7a in FIG. 4 optionally has additional functionality. For example, the freeze button 7a may cause control circuit 510 to start and stop the dispensing of the liquid nitrogen into the container 3. In essence, the control circuit 510 can have a connection point to the dosing system such that the freeze button 7a activates some sort of valve (e.g., valve 560, depending on the selected dosing system), such as a needle valve or a solenoid valve, which releases liquid nitrogen into the container 3. The printed circuit board 510 may also have a connection point for a level sensor, which would ensure that the liquid nitrogen supply is sufficient. The dosing system may also have a phase separator such that a known quantity of liquid can be added. The software associated with the Freeze button can be programmed to have different liquid nitrogen dispensing algorithms for different sizes or variations of frozen novelty products. An example algorithm is shown in FIG. 6. In this variation, Size knob 7d can be used to select which liquid nitrogen dispensing algorithm is used. For instance, a large size requires more liquid nitrogen dispensed than a regular size. The algorithms may be based on a combination of the following factors: quantity of liquid nitrogen, time, output of sensor 520 (a viscosity or temperature measurement), and torque of the motor(s). The liquid nitrogen, when added manually or through the integrated dosing system, can be added in one bulk pouring or in multiple releases over a period of time. Typical dispensing times are under two minutes for a 4-10 ounce batch size.

FIG. 6 illustrates several methods that may be performed using control circuit 510. These include a) determining at regular intervals if more or less liquid nitrogen should be added and turning on or off valve 560 accordingly; b) monitoring an amount of cooling that has been provided to the ingredients and turning on or off valve 560 accordingly; c) detecting which of panel controls 580 have been activated; starting and stopping motors 13 and/or 15; and monitoring viscosity of the frozen ingredients and turning on or off valve 560 accordingly.

Figure 7:
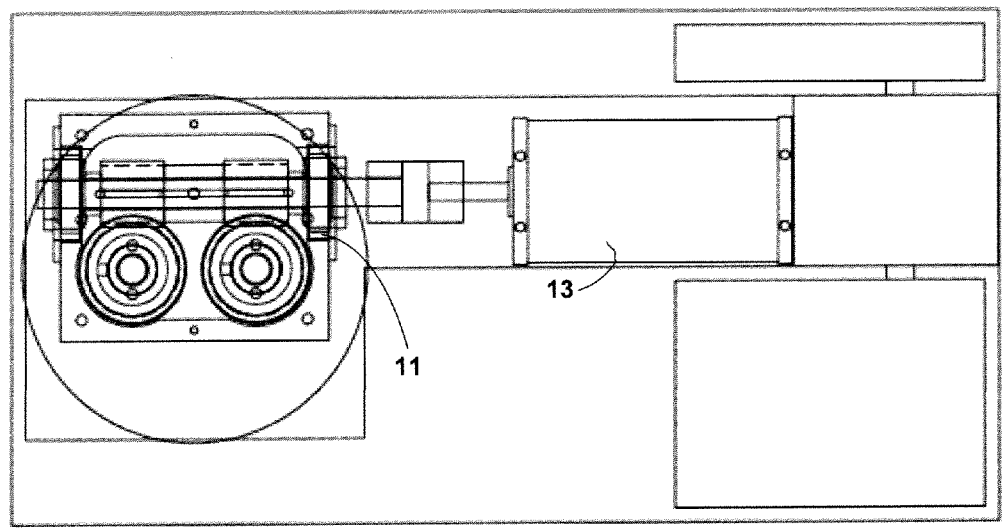
FIG. 7 illustrates the beater drive system, according to various embodiments of the invention.
Figure 7:
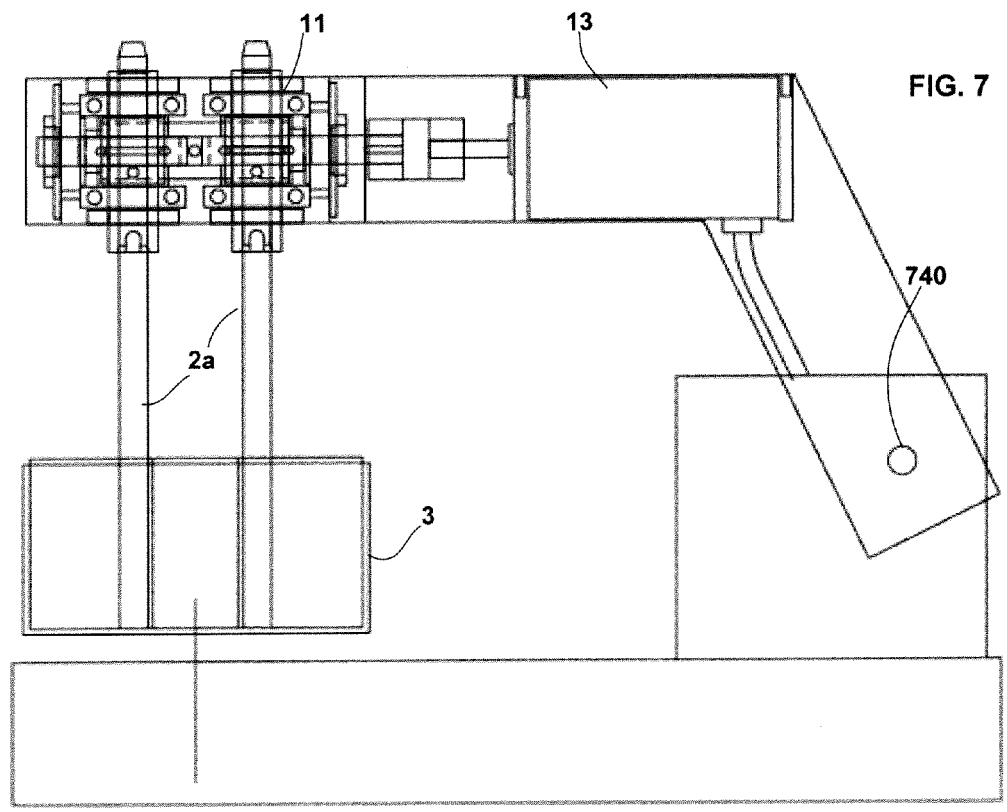

FIG. 7A shows the beater drive system, according to various embodiments of the invention. The beater drive system includes a beater motor 13, mechanically coupled to transmission 11 and drive shafts 2a configured to turn the beaters 2. The beater motor 13 optionally includes sensor 520 configured to measure motor speed or current drawn by one or more of the motors 13 or 15. The beater drive system typically includes a hinge 740 configured such that the beaters 2 can be lifted from the container 3. Hinge 740 is optionally motorized and controlled by control circuit 510. In alternative embodiments, the same motor is configured to rotate any combination of beaters 2, hinge 740, and/or container 3. The beater drive system is optionally configured to rotate beaters in the same direction, and optionally configured to rotate at least one of beaters 2 in a direction opposite the rotation of container 3.

FIG. 7B illustrates an alternative position for beater motor 13. It also shows the beater drive system in an elevated position above container 3. The beater drive system is elevated by rotation around hinge 740.

Figure 8A:
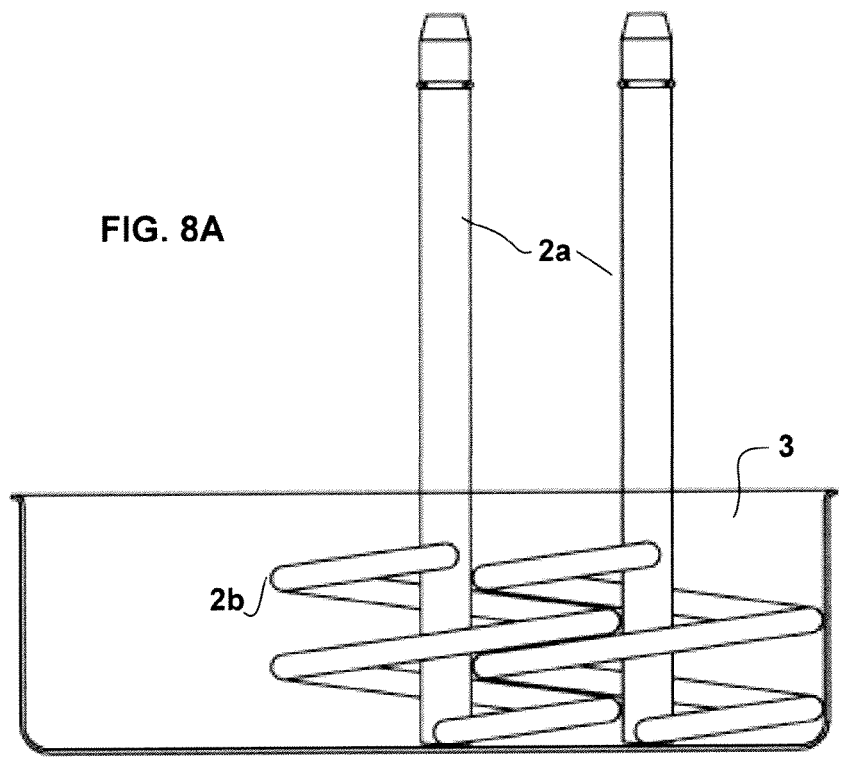
FIGS. 8A-C illustrates helical beaters in a container, according to various embodiments of the invention.
Figure 8B:
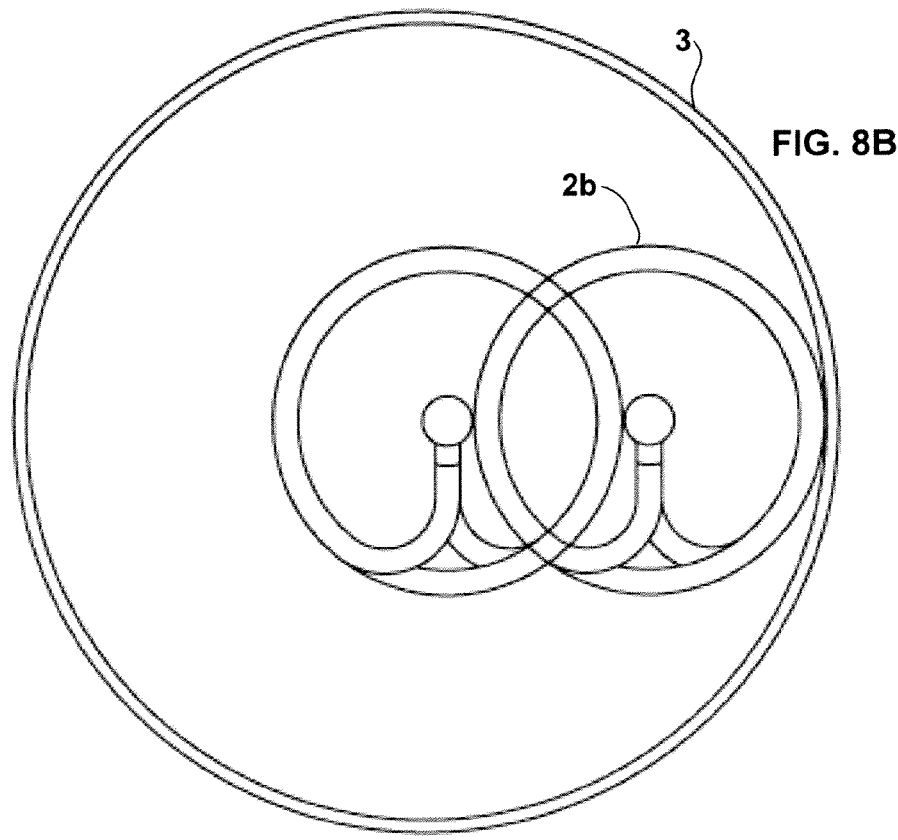

FIGS. 8A and 8B show examples of helical beaters 2 in a container 3, according to various embodiments of the invention, in these examples the helical beaters 2 are disposed such that one of the beaters is closer to a side surface 810 of the container 3. In various embodiments the distance between the closer beater 2 and side surface 810 is less than $1/4$, $3/16^{th}$, $1/8^{th}$, or $1/16^{th}$. However, in typically embodiments the closer beater is disposed such that it does not touch side surface 810. Similar positioning between side surface 810 and beaters may be found in embodiments wherein beaters 2 are symmetrically disposed within container 3. These positions allow beaters 2 to clean frozen product from side surface 810. If the beaters 2 rotate in opposite directions, then that beater closest to side surface 810 is rotated in a direction counter to side surface 810. Otherwise, the rotations are such that at least one of beaters 2 is disposed next to side surface 810 and rotates in a direction opposite to the direction side surface 810 is rotated.

Figure 8C:
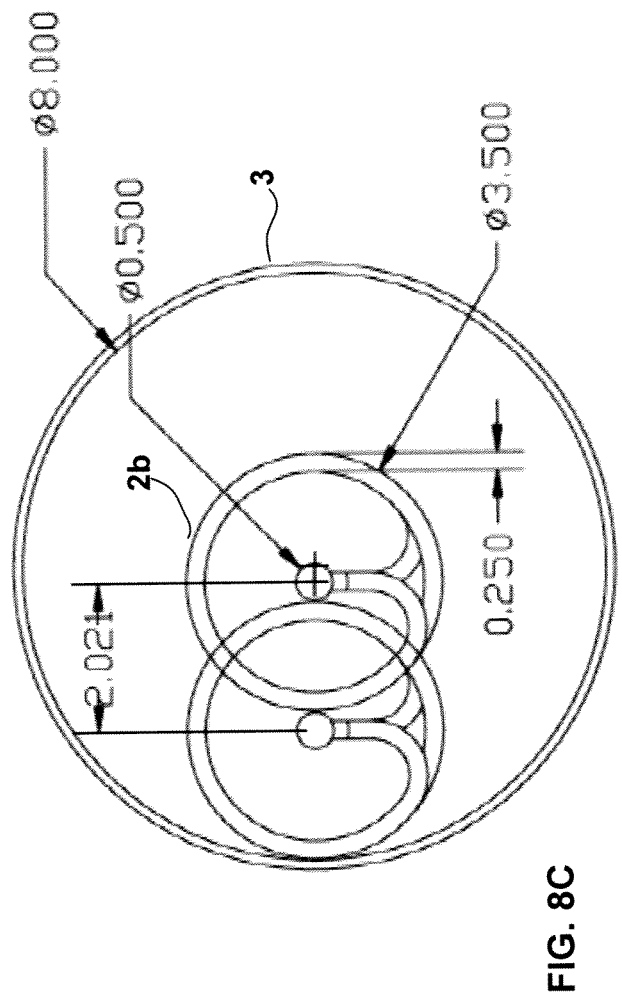

FIG. 8C illustrates one example of a top view of beaters 2 and container 3. The distances are shown in inches and degrees, and are meant to be non-limiting examples.

Figure 9:
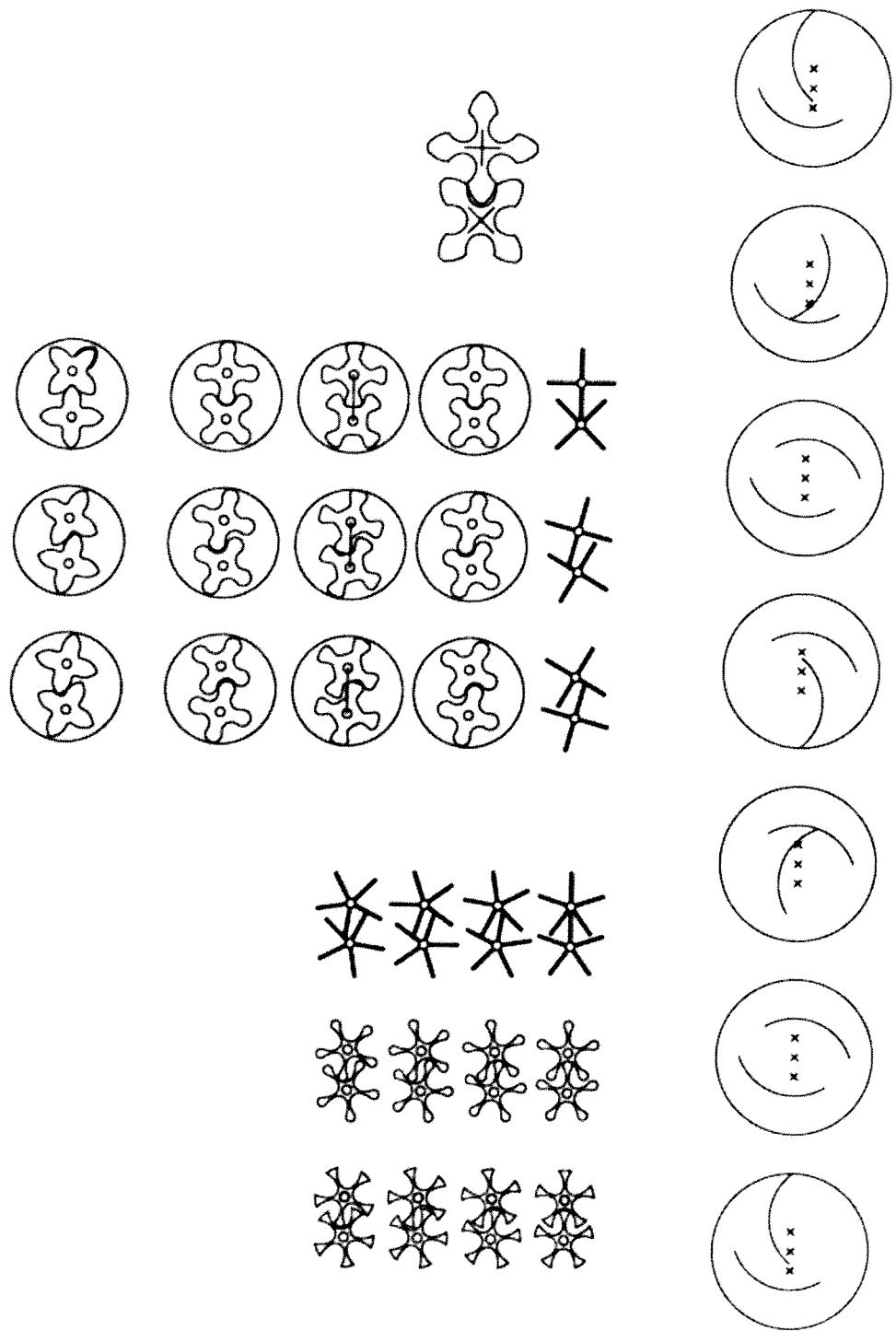
FIG. 9 illustrates alternative beater/agitator designs, according to various embodiments of the invention.

FIG. 9 illustrates various alternative beater/agitator designs, according to various embodiments of the invention. One feature common to most of these designs is that they are self cleaning. In each example the beaters rotate so as to remove frozen product from each other and/or from surfaces of the container 3.

Figure 10:
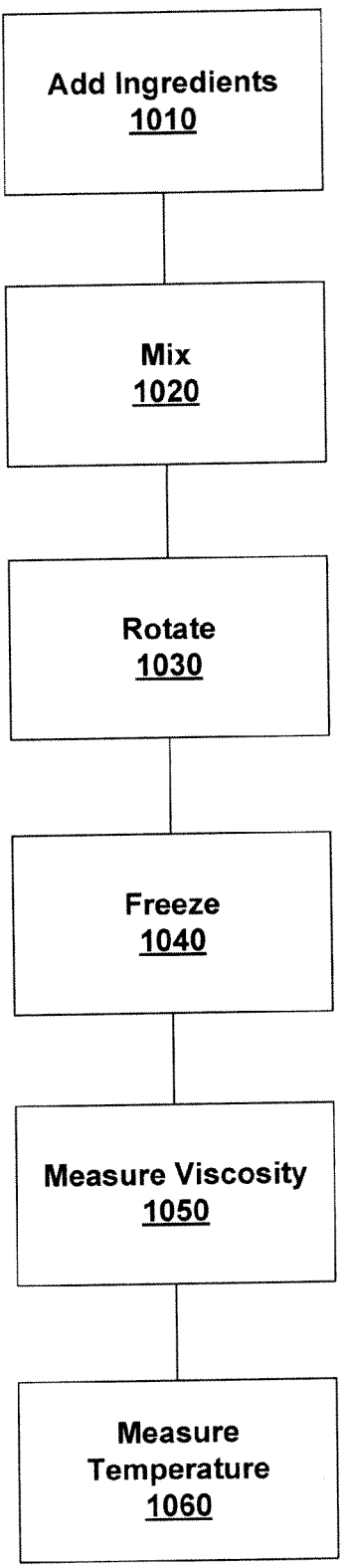
FIG. 10 illustrates a method of making frozen ice cream, according to various embodiments of the invention.

FIG. 10 illustrates a method of making frozen ice cream, according to various embodiments of the invention. In an add ingredients step 1010 ice cream ingredients are added to container 3. As described herein the ingredients can include a wide variety of food stuffs including cream, yogurt, sugar, flavoring, and the like.

In a mix step 1020 the ingredients are mixed using two or more interlocking beaters 2. In various embodiments, the beaters are disposed to with less than $1/4$, $3/16^{th}$, $1/8^{th}$, or $1/16^{th}$ inches of each other. Preferably the beaters do not touch each other. At these distances the beaters operate to be self-cleaning, e.g., they clean frozen (ice cream) product from each other. Mixing occurs by rotating the interlocking beaters 2.

In an optional rotate step 1030, the container 3 is rotated. Typically this rotation occurs in a direction that is opposite the rotational direction of a member of the beaters 2 that is in close proximity to a side of the container. For example, the member of the beaters 2 that is closest to a side surface of the container. The container 3 can be rotated using the same or a different motor than is used to rotate the beaters 2.

In a freezing step 1040, a coolant is added to the ingredients in the container 3. The coolant is typically a liquefied gas such as liquid nitrogen, and is delivered in a control manner. For example, in some embodiment a controlled amount (volume or mass) of coolant is added. In some embodiments, the coolant is added for a specific length of time, until a measured viscosity of the ingredients is achieved, and/or until a desired temperature drop is achieved. Control can be achieved by opening and closing a valve or by collecting a specific amount of fluid from a reservoir.

The freezing step 1040 is optionally performed in parallel with a measure viscosity step 1050. In measure viscosity step 1050 the viscosity of the ingredients is measured using sensor 520 as the coolant is added. As discussed elsewhere herein, viscosity can be measured by monitoring current consumed by the motor 13 or 15, monitoring the speed of motor 13 or 15, and/or the like. If the viscosity is measured, then the delivery of the coolant to the ingredients can be controlled responsive to this measurement.

The freezing step 1040 is optionally performed in parallel with a measure temperature step 1060. In measure temperature step 1060 the temperature of the ingredients is measured using and embodiment of sensor 520 as the coolant is added. These embodiments of sensor 520 can include, for example, a thermocouple or an optical sensor. The measured temperature could be that of the ingredients themselves, part of beaters 2, part of container 3, part of a nozzle used to deliver the coolant, or of a metallic (or non-metallic) object placed in the stream of the coolant. If the temperature is measured then the delivery of the coolant to the ingredients can be controlled responsive to this measurement. Optionally, both temperature and viscosity are measured using separate embodiments of sensor 520.

Several embodiments are specifically illustrated and/or described herein. However, will be appreciated that modifications and variations are covered by the above teachings and within the scope of the appended claims without departing from the spirit and intended scope thereof. For example, while ice cream is discussed herein, alternative embodiments of the invention may be applied to frozen yogurt or other frozen foods. In some embodiments one of the interlocking beaters is held stationary while the other is rotated.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a container mount;
   a container configured to hold ingredients and to temporally attached to the container mount;
   a liquid nitrogen dosing system configured to provide a controlled amount of liquid nitrogen to the ingredients in the container such that the ingredients freeze; and
   beaters configured to mix the ingredients in the container and configured to be self-clearing to each other and clean the sides and bottom of the container, the beaters being disposed to pass within $1/16^{th}$ of an inch of each other without contacting each other, the self-cleaning being sufficient to remove the frozen ingredients from the interlocking beaters.

2. The system of claim 1, further comprising a second motor configured to rotate the interlocking beaters.

3. The system of claim 1, further comprising a temperature sensor configured to measure a cooling of the ingredients.

4. The system of claim 3, wherein the temperature sensor includes a thermal couple disposed not to come in contact with the ingredients.

5. The system of claim 3, further comprising a circuit configured to control the dosing system in response to the temperature sensor.

6. The system of claim 5, wherein the circuit includes an input configured for a user to select a hardness of the frozen ingredients and to control the dosing system in response to the selection.

7. The system of claim 1, further comprising a viscosity sensor configured to measure a viscosity of the ingredients.

8. The system of claim 7, wherein the viscosity sensor includes a torque or current sensor.

9. The system of claim 1, wherein the interlocking beaters are further configured to clean the frozen ingredients from a surface of the container.

10. The system of claim 1, wherein the interlocking beaters are disposed to pass within less than $\frac{1}{8}^{th}$ of an inch of a side of the container.

11. The system of claim 1, wherein the interlocking beaters are helical.

12. The system of claim 1, wherein a first of the beaters is disposed closer to a side of the container relative to a second of the beaters and the motor is configured to rotate the container mount in a direction opposite a rotation of the first beater.

13. The system of claim 1, wherein the container mount includes a spindle.

14. The system of claim 1, wherein the beaters are interlocking.

15. The system of claim 1, further comprising a first motor configured to rotate the container mount.

16. The system of claim 1, wherein the beaters are configured to pass within $\frac{1}{8}^{th}$ inch of all of a bottom of the container and thereby remove the frozen ingredients from the bottom of the container.

17. A method of making ice cream, the method comprising:
placing ingredients in a container;
mixing the ingredients using at least two interlocking beaters disposed such that the interlocking beaters are within $\frac{1}{8}^{th}$ of an inch of each other but do not touch each other;
rotating the container in a direction opposite a rotation of a member of the beaters closest to a side of the container;
freezing the ingredients during the steps of mixing and rotating by adding a controlled amount of a coolant to the ingredients, and
measuring viscosity of the ingredients and controlling delivery of the coolant to the ingredients responsive to the measured viscosity.

18. A method of making ice cream, the method comprising:
placing ingredients in a container;
mixing the ingredients using at least two interlocking beaters disposed such that the interlocking beaters are within $\frac{1}{8}^{th}$ of an inch of each other but do not touch each other;
rotating the container in a direction opposite a rotation of a member of the beaters closest to a side of the container; and
freezing the ingredients during the steps of mixing and rotating by adding a controlled amount of a coolant to the ingredient, wherein the coolant includes liquid nitrogen.

19. The method of claim 18, wherein the container is rotated using a first motor and the beaters are turned using a second motor.

20. The method of claim 17, wherein the viscosity is measured by monitoring load on a motor configured to rotate the container.

21. The method of claim 18, further comprising measuring a temperature and controlling delivery of the coolant to the ingredients responsive to the measured temperature.

22. The method of claim 21, wherein the measured temperature is a temperature of the ingredients.

23. The method of claim 21, wherein the measured temperature is a temperature of a thermocouple.

24. The method of claim 21, wherein the measured temperature is a measure of a metallic probe.

25. A system comprising:
a container configured to hold ingredients;
at least two interlocking beaters configured to mix the ingredients in the container and configured to be self clearing from each other and to clean a side surface of the container;
a liquid nitrogen dosing system configured to provide a controlled amount of cooling from a liquid nitrogen source to the ingredients;
a temperature sensor configured to measure the controlled amount of cooling; and
a controller configured to regulate the delivery of liquid nitrogen from the liquid nitrogen source in response to the measurement of the controlled amount of cooling.

26. The system of claim 25, wherein the container is further configured to rotate.

27. The system of claim 25, where one of the interlocking beaters is configured to be held stationary while an other of the interlocking beaters is rotated.

28. The system of claim 25, wherein the interlocking beaters are configured to within $\frac{1}{8}^{th}$ inch of essentially all of a bottom of the container.

29. The system of claim 1, further comprising a circuit configured to control delivery of the coolant to the ingredients responsive to a measured viscosity of the ingredients.

* * * * *